US010025633B2

(12) United States Patent
Couvee et al.

(10) Patent No.: US 10,025,633 B2
(45) Date of Patent: Jul. 17, 2018

(54) METHOD FOR OPTIMIZING MEMORY ACCESS IN A MICROPROCESSOR INCLUDING SEVERAL LOGIC CORES UPON RESUMPTION OF EXECUTING AN APPLICATION, AND COMPUTER IMPLEMENTING SUCH A METHOD

(75) Inventors: Philippe Couvee, Villard Bonnot (FR); Yann Kalemkarian, Grenoble (FR); Benoit Welterlen, Grenoble (FR)

(73) Assignee: BULL SAS, Les Clayes Sous Bois (FR)

( * ) Notice: Subject to any disclaimer, the term of this patent is extended or adjusted under 35 U.S.C. 154(b) by 0 days.

(21) Appl. No.: 13/581,279

(22) PCT Filed: Jul. 7, 2011

(86) PCT No.: PCT/FR2011/051616
§ 371 (c)(1),
(2), (4) Date: Aug. 24, 2012

(87) PCT Pub. No.: WO2012/007675
PCT Pub. Date: Jan. 19, 2012

(65) Prior Publication Data
US 2013/0111152 A1    May 2, 2013

(30) Foreign Application Priority Data

Jul. 12, 2010  (FR) ..................................... 10 55681

(51) Int. Cl.
*G06F 9/50* (2006.01)
*G06F 9/30* (2018.01)
(Continued)

(52) U.S. Cl.
CPC ........ *G06F 9/5016* (2013.01); *G06F 9/30123* (2013.01); *G06F 9/46* (2013.01);
(Continued)

(58) Field of Classification Search
CPC ...... G06F 12/0806; G06F 8/4441; G06F 9/46; G06F 9/30123
See application file for complete search history.

(56) References Cited

U.S. PATENT DOCUMENTS 4,761,783 A * 8/1988 Christensen et al. ......... 714/763
5,361,337 A * 11/1994 Okin ............................. 712/228
(Continued)

OTHER PUBLICATIONS

PCT International Search Report for PCT Application No. PCT/FR2011/051616, dated Nov. 30, 2011.

*Primary Examiner* — Charles Rones
*Assistant Examiner* — Tian-Pong Chang
(74) *Attorney, Agent, or Firm* — Pillsbury Winthrop Shaw Pittman LLP

(57) ABSTRACT

The invention relates in particular to optimizing memory access in a microprocessor including several logic cores upon the resumption of executing a main application, and enabling the simultaneous execution of at least two processes in an environment including a hierarchically organized shared memory including a top portion and a bottom portion, a datum being copied from the bottom portion to the top portion for processing by the application. The computer is adapted to interrupt the execution of the main application. Upon an interruption in the execution of said application, a reference to a datum stored in a top portion of the memory is stored, wherein said datum must be used in order to enable the execution of the application. After programming a resumption of the execution of the application and before the resumption thereof, said datum is accessed in a bottom portion of the memory in accordance with the reference to be stored in a top portion of the memory.

15 Claims, 5 Drawing Sheets

(51) Int. Cl.
  *G06F 9/46* (2006.01)
  *G06F 12/0862* (2016.01)
  *G06F 12/0806* (2016.01)
  *G06F 8/41* (2018.01)
  *G06F 12/0842* (2016.01)

(52) U.S. Cl.
  CPC .......... *G06F 9/461* (2013.01); *G06F 12/0862* (2013.01); *G06F 8/4441* (2013.01); *G06F 12/0806* (2013.01); *G06F 12/0842* (2013.01); *G06F 2212/6028* (2013.01)

(56) References Cited

U.S. PATENT DOCUMENTS

| | | | |
|---|---|---|---|
| 6,026,471 | A | 2/2000 | Goodnow et al. |
| 6,295,580 | B1 * | 9/2001 | Sturges ............... G06F 12/0842 709/250 |
| 7,120,915 | B1 * | 10/2006 | Singh .................... G06F 9/3851 712/228 |
| 7,318,066 | B2 * | 1/2008 | Kaufman .......... G06F 17/30572 |
| 2003/0154349 | A1 * | 8/2003 | Berg et al. .................... 711/137 |
| 2004/0107337 | A1 * | 6/2004 | Sugure ............... G06F 9/30043 712/228 |
| 2004/0243765 | A1 | 12/2004 | Lee et al. |
| 2005/0138628 | A1 | 6/2005 | Bradford et al. |
| 2006/0179225 | A1 * | 8/2006 | Wester .................. G06F 9/3802 711/125 |
| 2007/0277001 | A1 * | 11/2007 | Mevergnies et al. ......... 711/145 |
| 2008/0284788 | A1 * | 11/2008 | Ando et al. ................... 345/557 |
| 2009/0248988 | A1 * | 10/2009 | Berg et al. .................... 711/141 |
| 2009/0271586 | A1 * | 10/2009 | Shaath .......................... 711/163 |
| 2011/0161586 | A1 * | 6/2011 | Potkonjak et al. ........... 711/122 |

* cited by examiner

METHOD FOR OPTIMIZING MEMORY ACCESS IN A MICROPROCESSOR INCLUDING SEVERAL LOGIC CORES UPON RESUMPTION OF EXECUTING AN APPLICATION, AND COMPUTER IMPLEMENTING SUCH A METHOD

CROSS-REFERENCE TO RELATED APPLICATIONS

This application is a U.S. National Phase under 35 U.S.C. § 371 of International Application PCT/FR2011/051616, filed Jul. 7, 2011, which designated the U.S., and which claims priority under 35 U.S.C. § 119 to French Patent Application Number 1055681, filed on Jul. 12, 2010. The disclosures of the above-described applications are hereby expressly incorporated by reference in their entireties.

The present invention concerns memory accesses in microprocessors and more particularly a method of optimizing memory access, on resuming execution of an application, in a microprocessor comprising several logical cores, for example a microprocessor implementing a technology known under the name simultaneous multi-threading, in particular in the context of high performance computing, as well as a computer program implementing such a method.

High Performance Computing (HPC) is being developed for university research and industry alike, in particular in technical fields such as aeronautics, energy, climatology and life sciences. Modeling and simulation make it possible in particular to reduce development costs and to accelerate the placing on the market of innovative products that are more reliable and consume less energy. For research workers, high performance computing has become an indispensable means of investigation.

This computing is generally conducted on data processing systems called clusters. A cluster typically comprises a set of interconnected nodes. Certain nodes are used to perform computing tasks (computing nodes), others for storing data (storage nodes) and one or more others manage the cluster (administration nodes). Each node is for example a server implementing an operating system such as Linux (Linux is a trademark). The connection between the nodes is, for example, made using Ethernet or Infiniband links (Ethernet and Infiniband are trademarks).

FIG. 1 is a diagrammatic illustration of an example of a topology 100 for a cluster, of fat-tree type. The latter comprises a set of nodes of general reference 105. The nodes belonging to the set 110 are computing nodes here whereas the nodes of the set 115 are service nodes (storage nodes and administration nodes). The computing nodes may be grouped together in sub-sets 120 called computing islands, the set 115 being called service island.

The nodes are linked together by switches, for example hierarchically. In the example illustrated in FIG. 1, the nodes are connected to first level switches 125 which are themselves linked to second level switches 130 which in turn are linked to third level switches 135.

As illustrated in FIG. 2, each node generally comprises one or more microprocessors, local memories and a communication interface. More specifically, the node 200 here comprises a communication bus 202 to which there are connected:

central processing units (CPUs) or microprocessors 204;
components of random access memory (RAM) 206, comprising registers adapted to record variables and parameters created and modified during the execution of programs (as illustrated, each random access memory component may be associated with a microprocessor); and,
communication interfaces 208 adapted to transmit and to receive data.

The node 200 furthermore possesses here internal storage means 210, such as hard disks, able in particular to contain the executable code of programs.

The communication bus allows communication and interoperability between the different elements included in the node 200 or connected to it. The microprocessors 204 control and direct the execution of the instructions of portions of software code of the program or programs. On powering up, the program or programs which are stored in a non-volatile memory, for example a hard disk, are transferred into the random access memory 206.

To improve the performance of each node, the microprocessors used are often multi-core microprocessors, that is to say microprocessors comprising several cores which can be used in parallel.

Furthermore, as the execution time for instructions in a microprocessor is generally shorter than the time to access data in memory, special memories, termed cache memories, are generally used. Thus, typically, there is a memory hierarchy whereby different memories are organized according to their access time and their cost and, consequently, their size. Such an organization is represented in FIG. 3. The memory here comprises six types of memory organized hierarchically: a mass storage memory, a central memory, a level L3 cache memory, a level L2 cache memory, a level L1 cache memory and a register. As illustrated, the more expensive and fast the memory, the more the corresponding memory size is limited.

A possible optimization for the execution of an application then consists of making data rise in the memory hierarchy during the execution of the application, from a low level memory, for example a mass storage memory, to a cache memory of high level, preferably a cache memory of level L1, or a register, such that the data to be used are as close as possible to the microprocessor when the latter has need thereof. Such an optimization, known as prefetching, may be explicit and be carried out in the application itself using corresponding instructions. It may also be implicit and be carried out by a compiler when compiling the application or by the microprocessor itself when executing the application.

However, while this technology enables the performance of a microprocessor to be significantly improved, its utilization may be disturbed by the execution of ancillary programs. To be precise, during the execution of a main program, interrupts are often generated to execute, in particular, ancillary tasks of the operating system, termed daemons. Further to an interrupt and when executing a daemon, the cache memories are optimized for executing that daemon. Consequently, after the execution of the daemon and when the microprocessor executes the main program again, the cache memories contain data relative to the daemon and there is a latency time due to the rising up in the memory hierarchy of data linked to the main application.

The invention enables at least one of the problems set forth above to be solved.

The invention thus relates to a method for a computer for optimizing memory access in a microprocessor of said computer on resuming execution of a main application, said microprocessor enabling the simultaneous execution of at least two processes in an environment comprising a shared memory organized hierarchically comprising at least an upper part and a lower part, at least one item of data being copied from the lower part to the upper part to be processed by said main application, said computer being adapted to interrupt the execution of said main application, the method comprising the following steps, at the time of an interruption of the execution of said main application, storing at least one reference to at least one item of data stored in an upper part of said memory, said at least one item of data to be used to enable the execution of said main application, after programming a resumption of execution of said main application and before the resumption of execution of said main application, accessing said at least one item of data in a lower part of said memory according to said at least one reference; and, storing said at least one item of data in an upper part of said memory.

The method according to the invention thus makes it possible, by anticipation, to access data to be processed by an application at the time of its resumption, so reducing the time for that resumption.

The method further comprises, preferably, a step of accessing at least one configuration parameter for said main application, said step of accessing said at least one item of data being carried out according to said at least one parameter.

Advantageously, the method further comprises a preliminary declaring step, during which said at least one main application is declared to be privileged and a step of defining said at least one parameter. Such declaring enables the memory access optimization method to be triggered selectively according to the applications that are executed.

According to a particular embodiment, the method further comprises a step of verifying said at least one parameter, said at least one parameter defining a data block size, said at least one reference comprising at least one memory address. The method thus enables memory access errors to be avoided.

Still according to a particular embodiment, said processor enables at least two logical cores to be implemented, it being possible for each of said at least two processes to be executed by one logical core, said at least two logical cores sharing said shared memory, said main application being executed by one of said at least two logical cores, instructions relative to the execution of said steps of accessing and storing said at least one item of data being sent to the other of said at least two logical cores The method according to the invention thus enables optimization of the access to the data necessary for the resumption of execution of the main application without degrading the execution performance of the applications.

Said microprocessor is, preferably, a multi-core microprocessor, said at least two logical cores being implemented in the same physical core such that they share a large part of the memory hierarchy used in order to optimize the access to the data and thus the execution resumption of a main application.

According to a particular embodiment, said instructions for storing said at least one reference to said at least one item of data and for accessing at least one item of data are initiated by a logical layer of said computer, for example a layer of an operating system implemented in said computer. The method according to the invention is thus easy to implement and requires only few modifications.

The invention also relates to a computer program comprising instructions adapted for the implementation of each of the steps of the method described earlier when said program is executed on a computer and to an information storage means, removable or not, that is partially or totally readable by a computer or a microprocessor containing code instructions of a computer program for executing each of the steps of the method described earlier.

The advantages procured by this computer program and this storage means are similar to those referred to above.

Other advantages, objects and features of the present invention will emerge from the following detailed description, given by way of non-limiting example, relative to the accompanying drawings in which.

Figure 1:
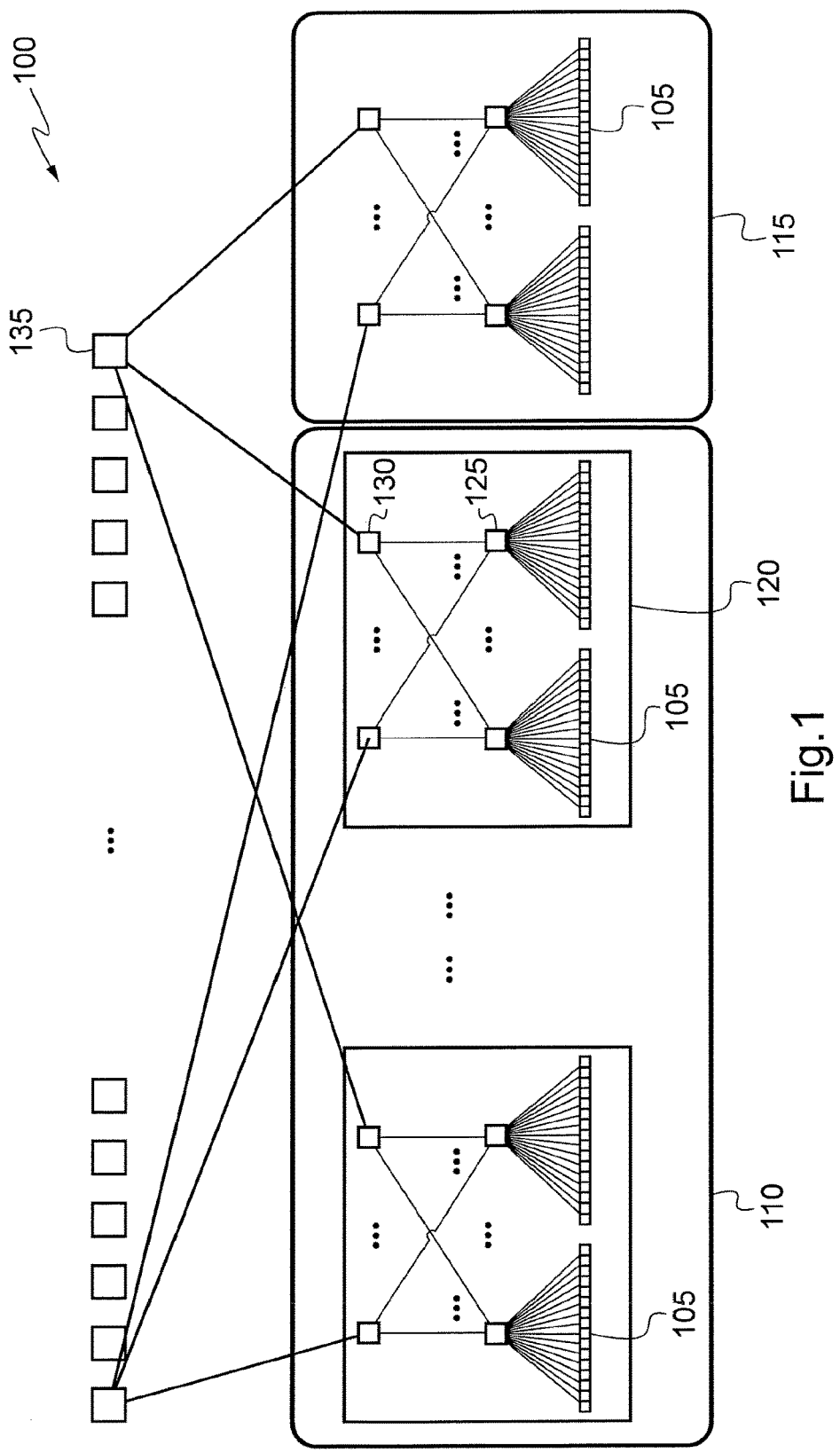
FIG. 1 illustrates an example of topology for a cluster.
Figure 2:
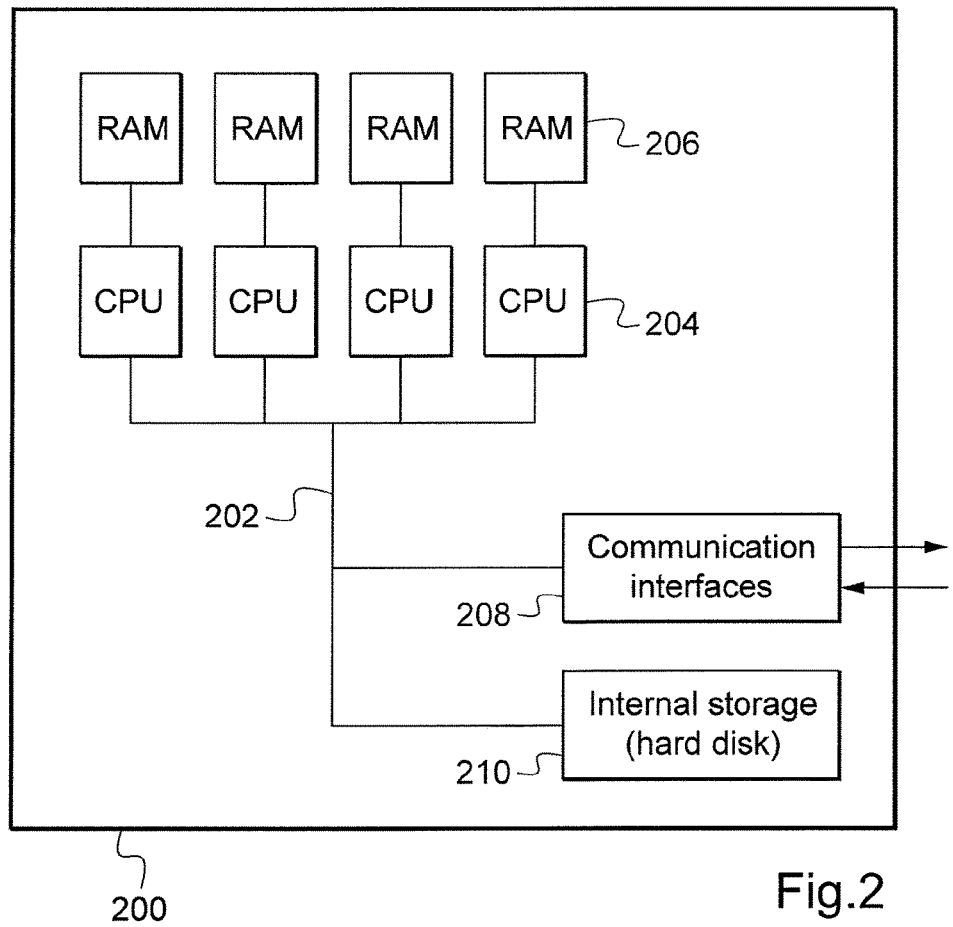
FIG. 2 illustrates an example of architecture for a node of a cluster.
Figure 3:
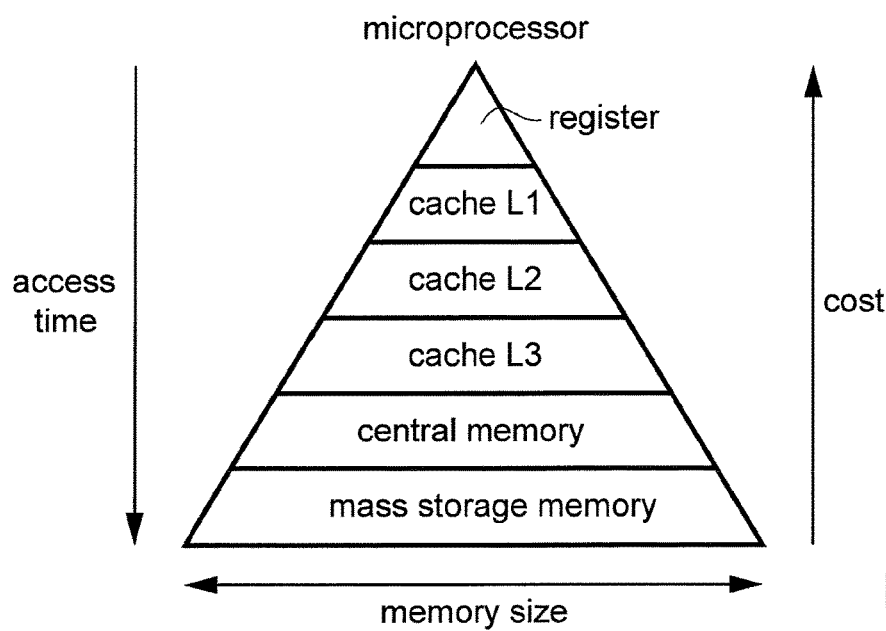
FIG. 3 is a diagrammatic representation of the hierarchical organization of memories in a data processing system.
Figure 4A:
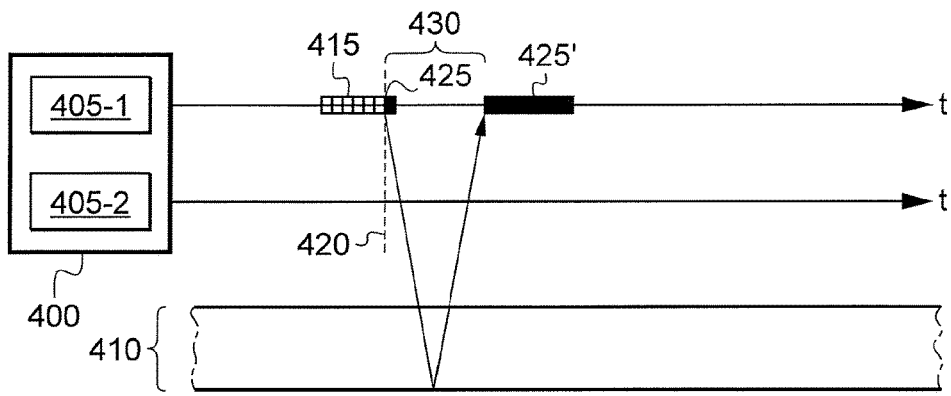
Figure 4B:
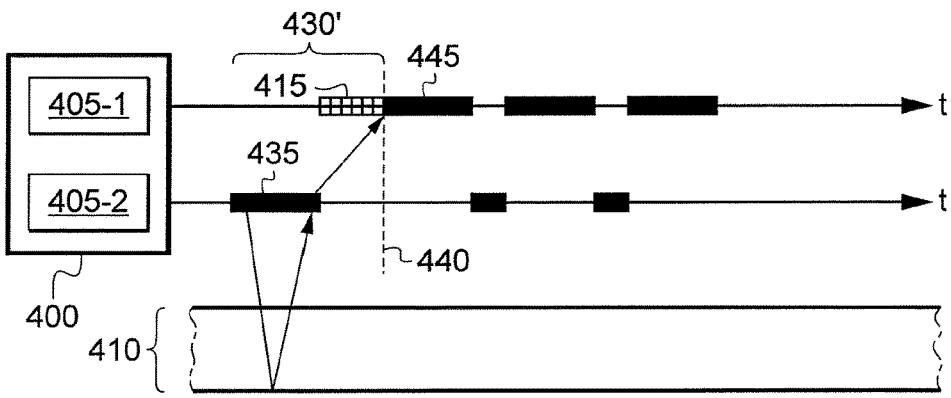
Figure 5:
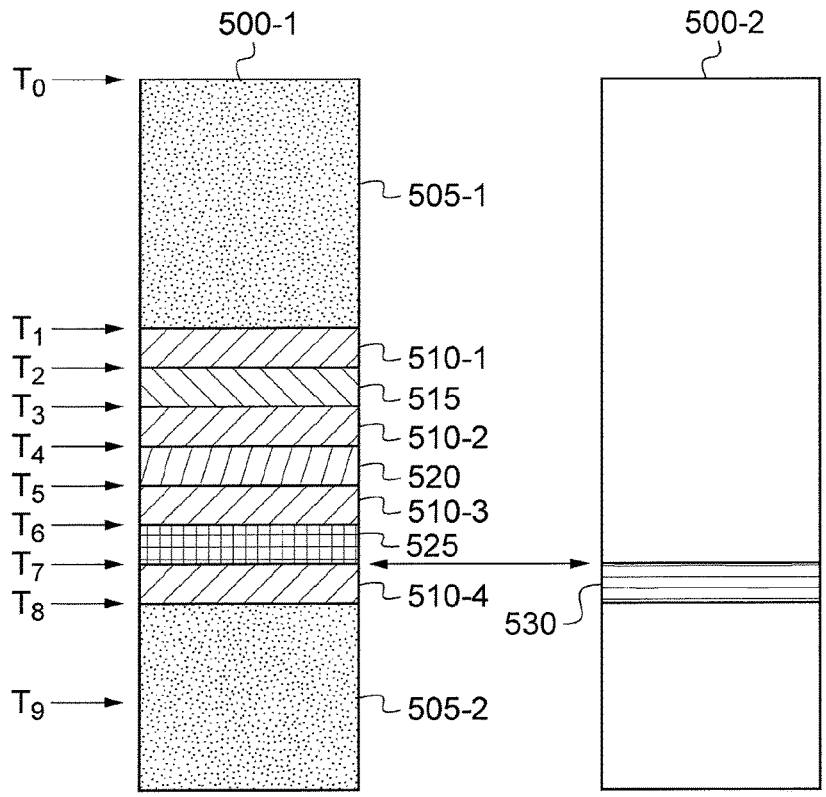
Figure 7A:
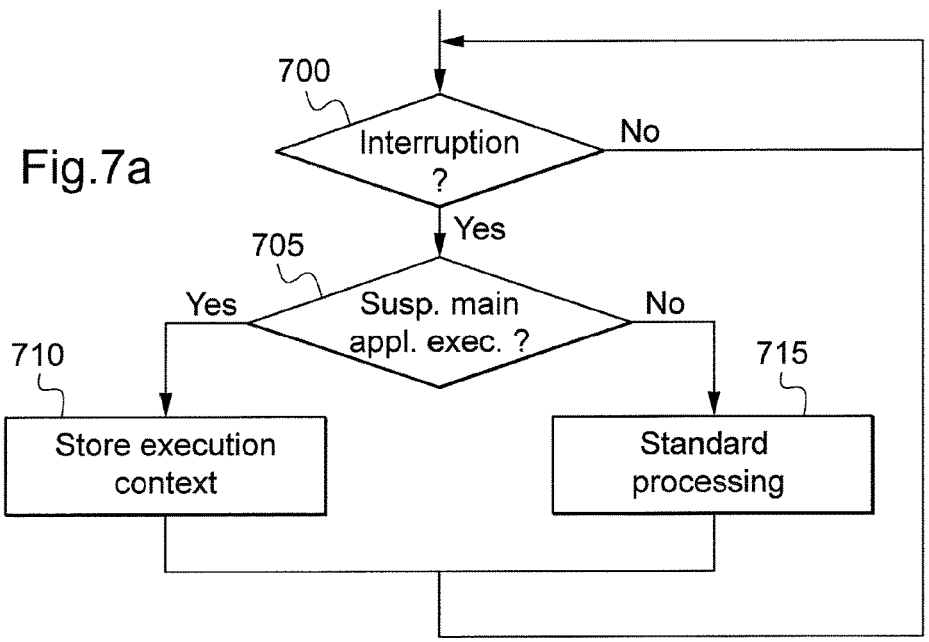
Figure 7B:
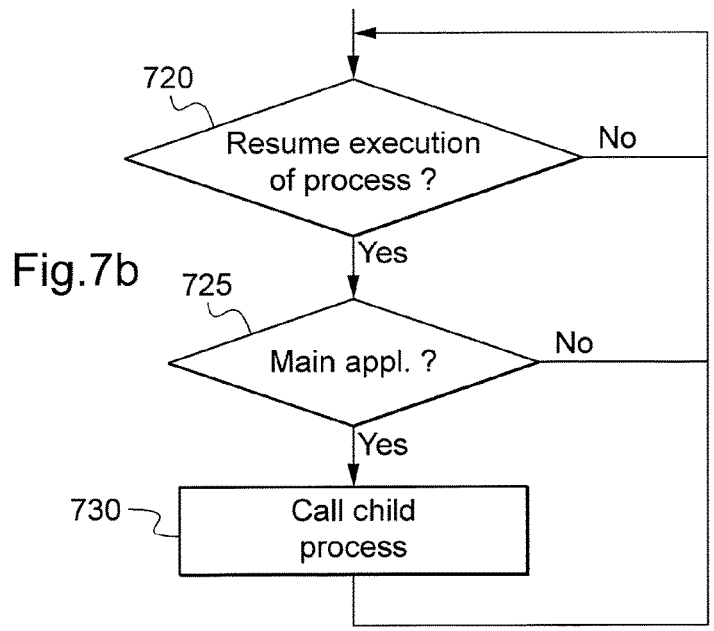
Figure 8:
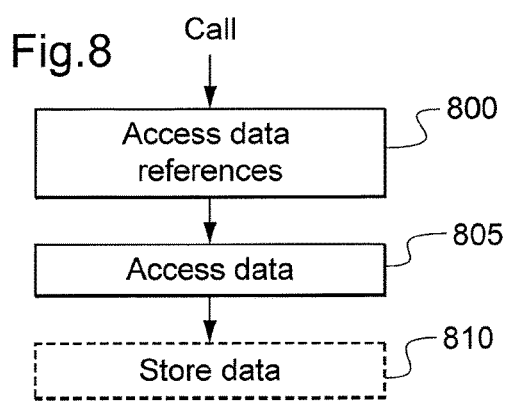
Figure 9:
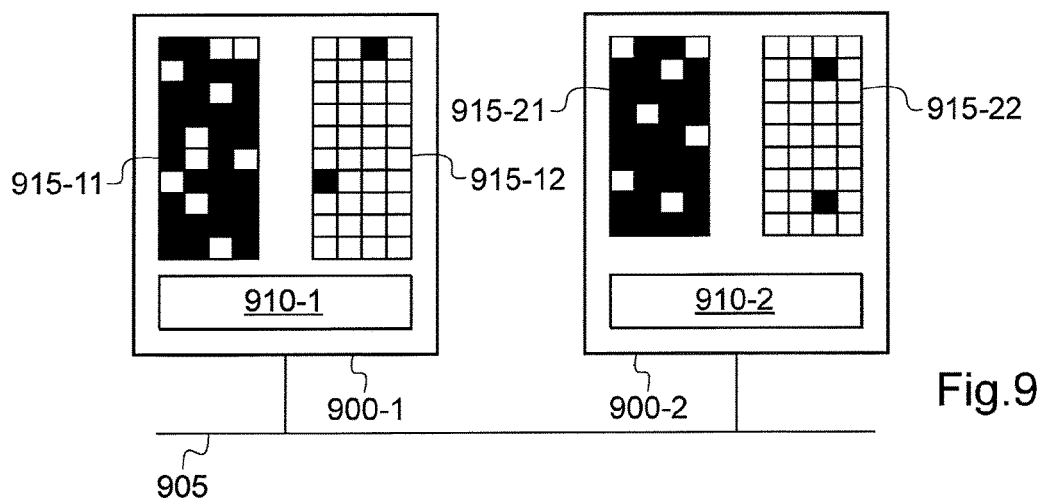

FIG. 4, comprising FIGS. 4a and 4b, illustrates the general concept of the invention whereby data are preloaded in anticipated manner;

FIG. 5 illustrates an example of sequences of instructions in a processor core comprising two logical cores implementing the invention;

FIG. 6, comprising FIGS. 6a to 6d, represents extracts from the content of a cache memory of level L1 of the microprocessor core described with reference to FIG. 5, at different instants;

FIG. 7, comprising FIGS. 7a and 7b, diagrammatically illustrates certain steps of an example algorithm that is implemented in an operating system to give a memory feeding function to a main application;

FIG. 8 illustrates certain steps of an example algorithm implemented by a memory-loading child process enabling the resumption of execution of a main application to be optimized; and FIG. 9 is a simplified representation of the logical architecture of a microprocessor of a node belonging to a cluster, the microprocessor here comprising two cores each implementing two logical cores.

The invention is generally directed to a mechanism for anticipated loading of cache memory to load data linked to the execution of a first application, during the execution of a second application executed further to an interruption of execution of the first application, in order to enable optimum resumption of execution of the first application.

It is to be recalled here that certain microprocessors comprise several logical cores. When these microprocessors comprise several physical cores, each of them is generally adapted to implement several logical cores. This technology, called simultaneous multi-threading (or hyperthreading according to Intel's implementation, Intel being a trademark), enables several elementary processes, called threads, to be executed in parallel in a physical core of a microprocessor. A physical core implementing this technology is thus generally perceived as a dual-core by the logical layer utilizing the physical core.

A physical core implementing this technology comprises resources shared between the logical cores and resources specific to each logical core. The shared resources are typically execution units, cache memories and the bus interfaces. The specific resources are in particular the registers for data and instructions of the logical core, for segments and for control as well as the interrupt controller (called APIC, standing for Advanced Programmable Interrupt Controller).

However, whereas this technology makes it possible to significantly improve the performance of a microprocessor for particular applications, in particular image processing applications, it has been observed that the performance was only slightly improved, or even degraded, for other applications, in particular scientific computing applications. It is thus generally deactivated in the clusters used for high performance computing.

Nevertheless, as this technology enables the execution of a limited number of instructions per logical core without disturbing the execution of another application executed by another logical core, the invention uses it to enable the anticipated loading of a cache memory when an ancillary application is executed. Thus, at a given time, a first logical core is associated with the execution of the ancillary application while a second logical core is used for loading a cache memory with data relative to a main application (that is to say a privileged application), in anticipation.

Thus, according to the invention, a first process, for example an application process of HPC type, is assisted by a second process, termed child process, which has the function of bringing back into cache memory data necessary for the execution of the first process after it has been interrupted. The data are brought back ahead of phase to optimize the resumption of the execution of the first process. These processes are advantageously implemented in two logical cores of a physical core to optimize the execution performance of a first process without increasing the costs linked to the hardware components used. Such a mechanism, which may be considered as a transition prefetching, is called memory feeding here.

FIG. 4, comprising FIGS. 4a and 4b, illustrates the general concept of the invention. More specifically, FIG. 4a represents a diagram of sequencing on execution resumption of a task in a microprocessor enabling the implementation of two logical cores one logical core of which is not used, whereas FIG. 4b represents a diagram of sequencing on execution resumption of a task in that same microprocessor when both logical cores are used to implement the invention.

The processor used to execute a main application here comprises a physical core 400 implementing two logical cores 405-1 and 405-2. The lines placed to the right of the core 400 represent, in relation to time, the tasks executed by each of the logical cores. Reference 410 here designates the depth of the memory hierarchy. The lower part represents the lower part of the hierarchy, that is to say the low level memory (the memory the furthest from the microprocessor), whereas the upper part represents the upper part of the hierarchy, that is to say the high level memory (the memory the closest to the microprocessor). Thus, to process an item of data not present in a high level memory, an instruction for accessing that item of data must descend to seek it in a memory of lower level then raise it up.

As illustrated in FIG. 4a when the logical core 405-2 is not used, the logical core 405-1 executes all the tasks. It is considered here for the execution of the main application to be interrupted at a given time (not represented) to execute an ancillary application of which, for example, the task 415 forms part. During the execution of that task, the cache memories containing data relative to the main application empty themselves of that data and instead receive data relative to the ancillary application. Thus, on resumption of the execution of the main application, at the time referenced 420, the task 425 of the main application is suspended for a period referenced 430 corresponding to the time for accessing the data necessary for the execution of the task. The time for accessing those data is represented by the arrow (descending and rising) passing through the depth of the memory hierarchy. As indicated by reference 425', the execution of the main application resumes as soon as the data are available. Although the data sought are generally no longer in the closest memory to the microprocessor, they are not always in the memory the furthest away either. Thus, the period 430 has a variable duration linked to the position of the data sought in the memory hierarchy.

When two logical cores of a physical core are used to implement the invention, one of the logical cores, for example the logical core 405-1, is used to execute the main application as well as the ancillary applications, in particular the daemons, whereas the other logical core, here the logical core 405-2, is used to execute an application linked to the main application and enabling transition prefetching. As illustrated in FIG. 4b a task 415 of an ancillary application may be executed by the logical core 405-1 further to the interruption of the execution of the main program. In parallel, the logical core 405-2 is used for loading data into a memory close to the microprocessor, typically a cache memory of level L1, which will be necessary for the execution of the main application at the time of its resumption. This task of accessing the data enabling the resumption of the execution of the main application is referenced 435 here. Thus, on resumption of the execution of the main application, referenced 440, the data necessary for its execution are present in a memory in proximity to the microprocessor which may then execute a task 445 of the main application without awaiting the availability of the data. The time for accessing those data, referenced 130', is a time masked by the execution of ancillary applications. It is thus not detrimental to the execution of the main application.

It is observed here that the mode of cooperation between a main application executed by a logical core and a secondary application, executed by a second logical core, with the object of loading data relative to that main application, may be strict or lax. When the mode of cooperation is strict, explicit synchronization between the applications is necessary whereas if it is lax, those applications are executed independently of each other, it being possible for the secondary application for loading data to know the needs in memory terms of the main application.

Memory references are advantageously used to enable the secondary application to anticipate the memory accesses of the main application in order to shorten for it the corresponding memory access time at the time of the resumption of its execution. The memory mapping may be obtained from a static analysis carried out on the basis of data from the compilation of the main application. This mapping enables memory blocks to be designated which, associated with time division, enables the memory accesses of the main application to be anticipated. The mapping may also be dynamic, deduced from reading traces of memory context left by the application itself, by the code for changing context of the hardware operating system or via inter-process mechanisms.

FIG. 5 illustrates an example of sequences of instructions in a processor core comprising two logical cores implementing the invention. FIG. 6, described in parallel with FIG. 5 and comprising FIGS. 6a to 6d, represents extracts from the content of a cache memory of level L1 of the microprocessor core described with reference to FIG. 5, at different times;

In FIG. 5, references 500-1 and 500-2 designate sequences of instructions of a first and a second instruction engine, corresponding to a first and a second logical core, respectively. The first instruction engine is used for the execution of several applications among which an HPC main application and ancillary tasks of the operating system. The second instruction engine is dedicated to the execution of a secondary application enabling the loading of data linked to a main application executed by the first instructions engine, here an HPC computing application.

Between the times $t_0$ and $t_1$, the instructions executed by the logical core corresponding to the sequence of instructions 500-1 are instructions of the main application for HPC computation, referenced 505-1. Between the times $t_1$ and $t_2$, the instructions executed by the logical core corresponding to the sequence of instructions 500-1 are instructions of a task of the operating system, referenced 510-1.

Figure 6A:
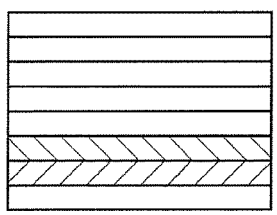

At time $t_1$, a prefetching mechanism is carried out, in standard manner, to preload data relative to the instructions 510-1 in order to optimize the execution of those instructions. The cache memory of level L1 of the microprocessor core here essentially comprises data relative to the main application for HPC computation executed beforehand as well as a few data relative to the executed task of the operating system, as illustrated in FIG. 6*a*.

Furthermore, as the main application for HPC computation is referenced as being privileged, the execution context is stored when the execution of that application is interrupted. In other words, the addresses of the data present in cache memory are stored to enable them to be loaded later, before the resumption of the execution of that main application.

Figure 6B:
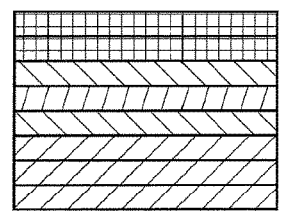

Between the times $t_2$ and $t_3$, the instructions executed by the logical core corresponding to the sequence of instructions 500-1 are instructions of a first ancillary application, referenced 515. Similarly, between the times $t_3$ and $t_4$, the instructions executed by the logical core corresponding to the sequence of instructions 500-1 are instructions of the previously mentioned task of the operating system, referenced 510-2. Similarly, between the times $t_4$ and $t_5$, the instructions executed by the logical core corresponding to the sequence of instructions 500-1 are instructions of a second ancillary application, referenced 520. Between the times $t_5$ and $t_6$, the instructions executed by the logical core corresponding to the sequence of instructions 500-1 are instructions of the previously mentioned task of the operating system, referenced 510-3. Similarly, between the times $t_6$ and $t_7$, the instructions executed by the logical core corresponding to the sequence of instructions 500-1 are instructions of a third ancillary application, referenced 525. The cache memory of level L1 of the microprocessor core thus comprises data relative to the task of the operating system executed as well as to the first, second and third ancillary applications, as illustrated in FIG. 6*b*.

Between the times $t_0$ and $t_7$, the logical core corresponding to the sequence of instructions 500-2 executes no instruction.

At time $t_7$, the memory feeding mechanism, enabling the anticipated loading of data relative to a main application before the resumption of its execution, is implemented. At that time, the logical core corresponding to the sequence of instructions 500-2 then executes instructions, referenced 530, for loading the data into cache memory the addresses of which have been stored at the time of the interruption of the main program.

Thus, between the times $t_7$ and $t_8$, the instructions executed by the logical core corresponding to the sequence of instructions 500-1 are instructions of the previously mentioned task of the operating system, referenced 510-4, whereas the instructions executed by the logical core corresponding to the sequence of instructions 500-2 are instructions enabling the loading into cache memory of the data the addresses of which have been stored at the time of the interruption of the main program.

Figure 6C:
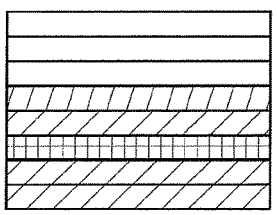

At time $t_8$, the cache memory of level L1 of the microprocessor core then comprises data relative to the executed task of the operating system, to the second and third ancillary applications, that is to say data relative to the last instructions executed, as well as data relative to the main application and which enable an optimal resumption of the execution thereof, as illustrated in FIG. 6*c*. The execution of the main program is resumed at that time as illustrated by the reference 505-2. Still starting from that time, the logical core corresponding to the sequence of instructions 500-2 executes no further instruction.

Figure 6D:
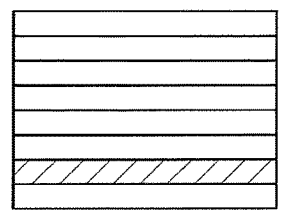

As illustrated in FIG. 6*d*, the cache memory of level L1 of the microprocessor core comprises, at time $t_9$, essentially data relative to the main application for HPC computation, as well as a few data relative to the task of the operating system executed beforehand which have not yet been replaced by data relative to the main application for HPC computation.

Thus, the main application executed on one of the logical cores is assisted by a child process executed on another logical core of the same physical core. This child process take on the task of bringing back into memory the data necessary for the main application ahead of phase to save (i.e. reduce the number of) waiting cycles that the main application would have to undergo while waiting to obtain the requested data.

In other words, invention is in particular directed to the putting in place of a cooperative mechanism between the operating system used and a memory loading process executed by a logical core belonging to a physical core of which another logical core executes a main application, the logical cores sharing at least one part of the memory hierarchy.

Thus, typically, the operating system launched on a logical core specifies a child process enabling a memory feeding function to be used when it is called or requested. This child process may be used only for applications considered as main, that is to say, for example, declared with a particular privilege. It is to be noted that when an application has been declared with such a privilege, the operating system makes the necessary checks in terms of privilege and parameterization. If, after checking, the authorization is given, the main application may access the memory feeding function when it is interrupted in its execution.

When the main application is interrupted, the operating system stores markers on the memory zones used by that application before its interruption. After those markers have been stored, the operating system may elect a new non-privileged task which is then executed by the logical core that executed the main application beforehand. Such markers are, for example, pairs formed by addresses and lengths, specifying sets of data.

When the operating system determines the resumption of the execution of the main application via its scheduler, it orders the memory feeding function from the child process. The latter then triggers the reading operations based on references for memory zones which the operating system has kept. It will thus shorten the memory distance and save waiting cycles on each recommencement of context change.

Advantageously, a main application may control the call to the memory feeding function by activating or by deactivating the service with the operating system.

Of course, the main application and the child process must be executed in environments in which at least part of the memory hierarchy is shared. The main application and the child process are thus, preferably, executed by two logical cores of the same physical core.

The OpenCL standard may be used to implement the interface described earlier between a main application and a child process for memory loading enabling the use of the memory feeding function. The functions used in such an interface are, for example, the following:

a function to yield the memory feeding capacities of the operating system used to an application,

```
cl_int clMFeedQuery(
    cl_MFeed *mf)
``` where mf represents the parameter of the function whose type is cl_MFeed;

a function enabling an application to declare itself as an application that is privileged with the operating system in order to benefit from the memory feeding function,

```
cl_int clMFeedDeclare(
    cl_MFeed mf,
    cl_MFeedParams *mfparams)
``` where mf represents the parameter of the function whose type is cl_MFeed and mfparams represents the parameter of the function whose type is cl_MFeedParams;

Advantageously, this function modifies the parameterization of the application, in particular in terms of size of data blocks to be prefetched and for synchronization with the child process to perform the memory feeding. These parameters are important and must, preferably, be the subject of verifications since wrong parameterization results in accentuating the effects of pollution for the other executed processes; and, a function for activating and a function for deactivating the memory feeding, service,

```
cl_int clMFeedStart(
    cl_MFeed *mf)
cl_int clMFeedStop(
    cl_MFeed *mf)
``` where mf represents the parameter of the function whose type is cl_MFeed.

FIG. 7, comprising FIGS. 7a and 7b, diagrammatically illustrates certain steps of an example algorithm that is implemented in an operating system to give a memory feeding function to a main application. FIG. 7a is essentially directed to the phase linked to the interruption of the execution of a main application whereas FIG. 7b is relative to its resumption.

It is admitted here that the main application declared itself in advance as being privileged and that the operating system had verified its memory feeding parameters.

A first step (step 700) is directed to detecting an interruption. If an interruption is detected, a following step (step 705) consists of a test to determine whether the interruption is directed to the suspension of the execution of a main application or not.

If the interruption is directed to the suspension of the execution of a main application, the context of the execution of that application is stored (step 710). As indicated previously, this step makes it possible in particular to store memory references in course of the main application.

In the opposite case, if the interruption is not directed to the suspension of the execution of a main application, the interruption receives standard treatment (step 715).

So long as it is not stopped, this algorithm repeats to process all the interruptions.

In parallel, as illustrated in FIG. 7b when the resumption of the execution of a process is planned by the scheduler (step 720), a test is carried out to determine whether the application corresponding to the process whose resumption is programmed is a main application or not (step 725).

If the application corresponding to the process whose resumption is programmed is a main application, the child process for memory loading is called to perform a memory feeding function (step 730). This step is directed to raising data in memory, in the memory hierarchy, whose references have been stored at the time of the storage of the execution context of the main application according to the parameters of the latter (set at the time of the declaration of the application as main application). It is to be recalled here that the child process is preferably executed by a logical core belonging to a physical core comprising another logical core used for executing the main application such that the child process and the main application share at least one part of the memory hierarchy. It has the object of going to seek data in memory at addresses stored in advance according to sizes of blocks linked to the main application.

So long as it is not stopped, this algorithm repeats to process all the application execution resumptions.

FIG. 8 illustrates certain steps of an example algorithm implemented by a memory-loading child process enabling the resumption of execution of a main application to be optimized.

After having been called, the memory-loading child process accesses (step 800) the references stored in advance at the time of the interruption of the execution of the main application and also accesses the parameters linked to that application. The stored references comprise in particular data addresses whereas the parameters comprise, in particular, the sizes of data blocks to be pre fetched as well as synchronization information.

As described earlier, due to the execution of processes distinct from the main application, the data to be used by the main application are generally no longer stored in proximity to the microprocessor, that is to say in an upper part of the memory hierarchy, in particular in cache memory of level L1, but in a lower part. The accessed references are thus used, according to a standard mechanism, to access those data (step 805) which are to be found in the memory hierarchy. According to this mechanism, a test is carried out on a first memory level, for example an L1 cache memory, to determine whether the data are present at that level. In the affirmative, they are accessed according to predetermined parameters. In the negative, another test is carried out on a second memory level, lower than the first memory level, for example an L2 cache memory, to determine whether the data are present at that level. Thus, by testing for the presence of the sought data in each memory level, going from one to the next, the data are found in the highest level.

The accessed data are then stored in an upper part of the memory according to predetermined parameters (step 810). It is observed here that, as suggested by the use of dashed line, this step is generally not carried out explicitly by the child process. To be precise, this step is the result of the access to the data. It is carried out automatically by the microprocessor at the time of the access through the cascaded effects of hardware calls.

As indicated earlier, numerous microprocessors capable of being used in nodes of clusters implement the technology called simultaneous multi-threading (or hyperthreading according to the Intel implementation, Intel being a trademark). When these microprocessors are used, this technology may be activated or not activated.

FIG. 9 is a simplified representation of the logical architecture of a microprocessor of a node belonging to a cluster, the microprocessor here comprising two physical cores each implementing two logical cores, that is to say a microprocessor in which simultaneous multi-threading has been activated, on execution of a high performance computing application. Each physical core here enables up to four instructions to be executed in the same cycle on account of the different execution units implemented in each physical core. Thus two logical cores may each execute up to four instructions according to the use made by the other core.

As illustrated, the physical cores 900-1 and 900-2 are linked by a system bus 905 to which there may be connected in particular a communication interface and a memory. Each physical core comprises execution units shared between the logical cores and an instruction register specific to each logical core.

Thus, the physical core 900-1 comprises a set 910-1 of execution units as well as the instruction register 915-11 linked to a first logical core of the physical core 900-1 and the instruction register 915-12 linked to a second logical core of the physical core 900-1. Similarly, the physical core 900-2 comprises a set 910-2 of execution units as well as the instruction register 915-21 linked to a first logical core of the physical core 900-2 and the instruction register 915-22 linked to a second logical core of the physical core 900-2.

The instructions executed by each of the logical cores are here represented by the black squares. Thus, as illustrated, the logical cores associated with the instruction registers 915-11 and 915-21 have the task of executing the applications as well as the operating system, with the exception of the memory management child processes which are executed by the logical cores associated with the memory registers 915-21 and 915-22 to enable a fast resumption of the main applications executed by the logical cores associated with the instructions registers 915-11 and 915-21.

Naturally, to satisfy specific needs, a person skilled in the art will be able to make amendments to the preceding description.

The invention claimed is:

1. A method of optimizing memory access in a microprocessor of a computer in resuming execution of a main application after an interruption caused by the computer, the microprocessor being configured to enable a plurality of logical cores to be implemented and to substantially simultaneously execute, via the plurality of logical cores, a plurality of processes in an environment comprising shared memory that is organized hierarchically having at least an upper part and a lower part such that data is copied from the lower part to the upper part when data is to be processed during the execution of the main application, the method comprising:

executing, via a first of the plurality of logical cores, the main application;

determining whether the main application is privileged;

in response to detecting the interruption of the execution of the main application and in response to a determination that the main application is privileged, executing, via a second of the plurality of logical cores, a child process of the main application that stores a reference to at least one data item indicative of the data to be processed, by the execution of the main application, in the lower part of the memory;

emptying, via the second logical core, the data to be processed by the execution of the main application from the upper part of the memory;

executing, via the first logical core, at least one ancillary application, the ancillary application being determined to not be privileged;

during the execution of the ancillary application, after scheduling a resumption of execution of the main application, and before the resumption of execution of the main application, accessing, via the second logical core, the at least one data item in the lower part of the memory according to the stored reference;

storing, via the second logical core, the at least one data item in the upper part of the memory before the scheduled resumption of execution of the main application; and resuming, via the first logical core, the execution of the main application after the storing of the at least one data item in the upper part of the memory.

2. The method according to claim 1, further comprising accessing at least one configuration parameter for the main application, wherein the at least one data item is accessed according to the parameter.

3. The method according to claim 2, further comprising: defining the parameter.

4. The method according to claim 3, further comprising verifying the parameter, wherein the parameter defines a data block size, and wherein the reference comprises at least one memory address.

5. The method according to claim 1, wherein instructions relative to the execution of the accessing and storing the at least one data item are sent to the second logical core.

6. The method according to claim 5, wherein the microprocessor is a multi-core microprocessor, and the logical cores are implemented in the same physical core.

7. The method according to claim 1, wherein the instructions for storing the reference to the at least one data item and for accessing the at least one data item are initiated by a logical layer of the computer.

8. The method according to claim 7, wherein the logical layer belongs to an operating system implemented in the computer.

9. The method according to claim 1, wherein the accessing of the at least one data item in the lower part of the memory is performed by iteratively testing a plurality of different memory levels of the hierarchically organized shared memory from the upper part down towards the lower part until the at least one data item is found, wherein the memory levels comprise two or more of cache level L3, cache level L2, cache level L1, main memory, and mass storage memory.

10. The method according to claim 1, wherein the reference to the at least one data item is stored in the lower part of the memory in response to the detected interruption being successfully tested with respect to whether the interruption is directed to suspension of the execution of the main application.

11. The method according to claim 1, wherein an instruction register is specific to each of the logical cores such that the first and second logical cores are operable to execute instructions from the respective instruction registers substantially simultaneously.

12. A computer system, comprising:
a processor, configured to substantially simultaneously execute a plurality of processes including execution of a main application;
a shared memory that is organized hierarchically having at least an upper part and a lower part in which data is copied from the lower part to the upper part when data is to be processed for the execution of the main application;
an operating system with a logical layer that optimizes memory access in resuming execution of the main application after an interruption initiated by the processor, the logical layer configured to operatively:
execute the main application;
determine whether the main application is privileged;
in response to detecting the interruption of the execution of the main application and in response to a determination that the main application is privileged, store a reference to at least one data item indicative of the data to be processed, by the execution of the main application, in the lower part of the memory;
empty the data to be processed by the execution of the main application from the upper part of the memory;
execute at least one ancillary application in the processor, the ancillary application being determined to not be privileged;
during the execution of the ancillary application, after scheduling a resumption of execution of the main application, and before the resumption of execution of the main application, access the at least one data item in the lower part of the memory according to the stored reference;
store the at least one data item in the upper part of the memory before the scheduled resumption of execution of the main application;
resume the execution of the main application after the storing the at least one data item in the upper part of the memory; and
enable a plurality of logical cores to be implemented, wherein each of the processes is executed by one of the logical cores, wherein the logical cores share the shared memory, wherein the main application and the ancillary application are executed by a first of the logical cores, and wherein a second of the logical cores controls the storing of the reference, the accessing of the at least one data item in the lower part of the memory, and the storing of the at least one data item in the upper part of the memory, the second logical core implementing a child process of the main application responsive to the determination that the main application is privileged.

13. The computer system according to claim 12, wherein instructions relative to the execution of the accessing and storing the at least one data item are sent to the second logical core.

14. A computer readable medium comprising non-transient instructions, which, when executed, cause the computer to optimize memory access in a microprocessor of a computer in resuming execution of a main application after an interruption caused by the computer, the microprocessor being configured to enable a plurality of logical cores to be implemented and to substantially simultaneously execute, via the plurality of logical cores, a plurality of processes in an environment comprising shared memory that is organized hierarchically having at least an upper part and a lower part such that data is copied from the lower part to the upper part when data is to be processed during the execution of the main application, the medium's instructions comprising:
executing, via a first of the plurality of logical cores, the main application;
determining whether the main application is privileged;
in response to detecting the interruption of the execution of the main application and in response to a determination that the main application is privileged, executing, via a second of the plurality of logical cores, a child process of the main application that stores a reference to at least one data item indicative of the data to be processed, by the execution of the main application, in the lower part of the memory;
emptying, via the second logical core, the data to be processed by the execution of the main application from the upper part of the memory;
executing, via the first logical core, at least one ancillary application, the ancillary application being determined to not be privileged;
during the execution of the ancillary application, after scheduling a resumption of execution of the main application, and before the resumption of execution of the main application, accessing, via the second logical core, the at least one data item in the lower part of the memory according to the stored reference;
storing, via the second logical core, the at least one data item in the upper part of the memory before the scheduled resumption of execution of the main application;
resuming, via the first logical core, the execution of the main application after the storing of the at least one data item in the upper part of the memory.

15. The medium according to claim 14, wherein instructions relative to the execution of the accessing and storing the at least one data item are sent to the second logical core.

* * * * *